E. W. BURGESS.
BALING PRESS.
APPLICATION FILED AUG. 8, 1914.

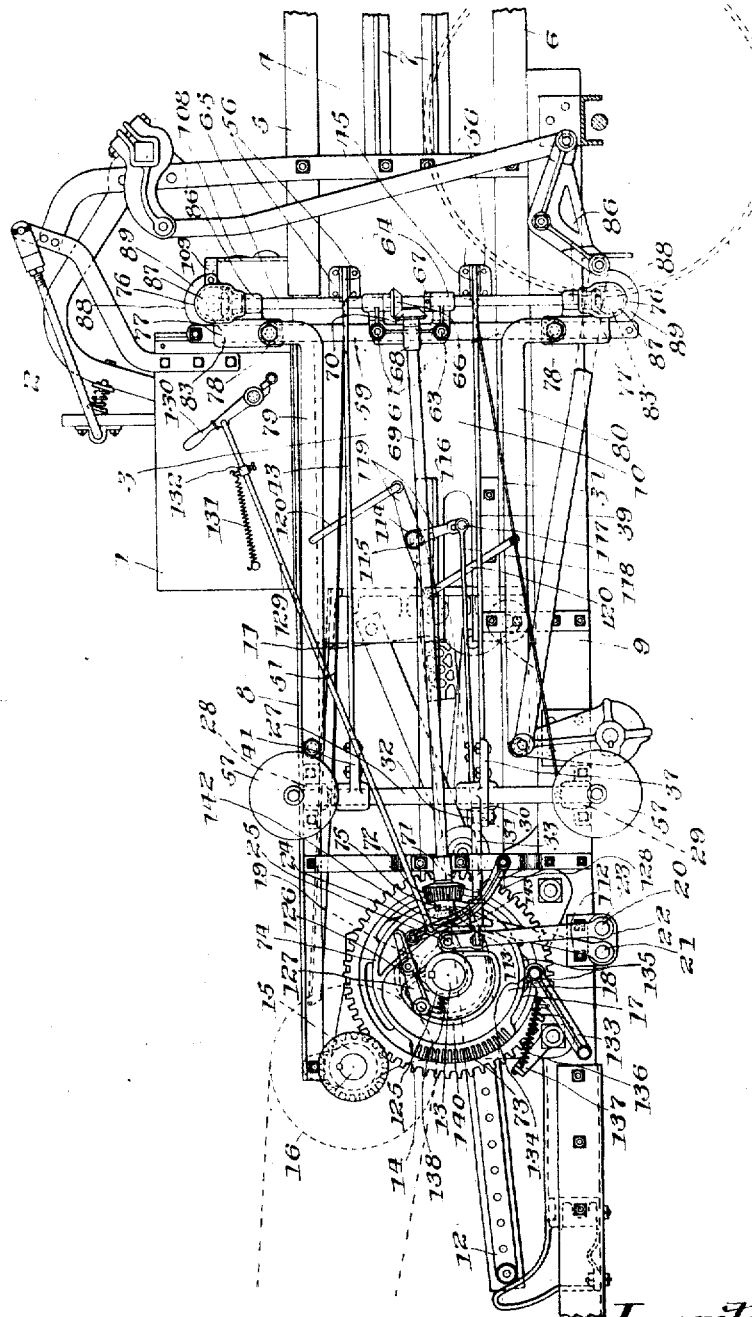

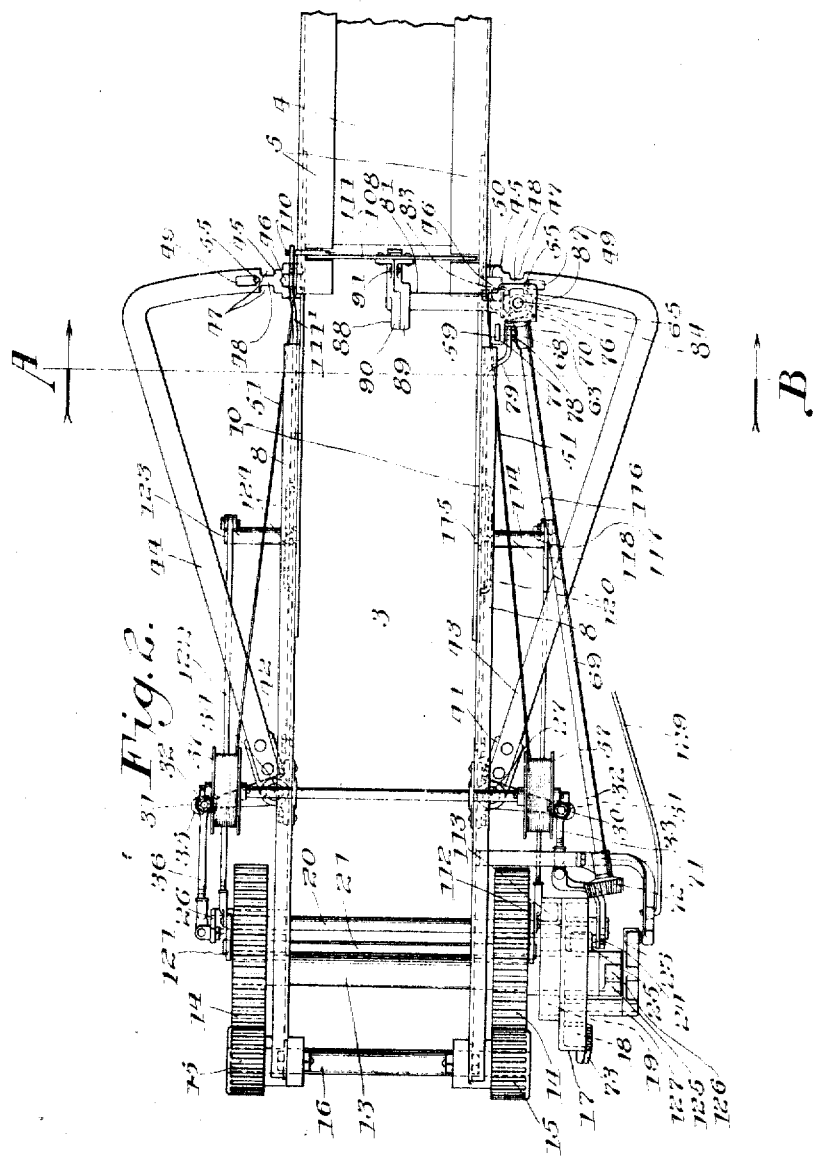

1,237,608.

Patented Aug. 21, 1917.
5 SHEETS—SHEET 3.

Witnesses:
C. C. Palmer.
F. W. Hoffmister.

Inventor.
Edward W. Burgess,
By Chas. E. Lord
Atty.

E. W. BURGESS.
BALING PRESS.
APPLICATION FILED AUG. 8, 1914.
1,237,608.
Patented Aug. 21, 1917.
5 SHEETS—SHEET 4.
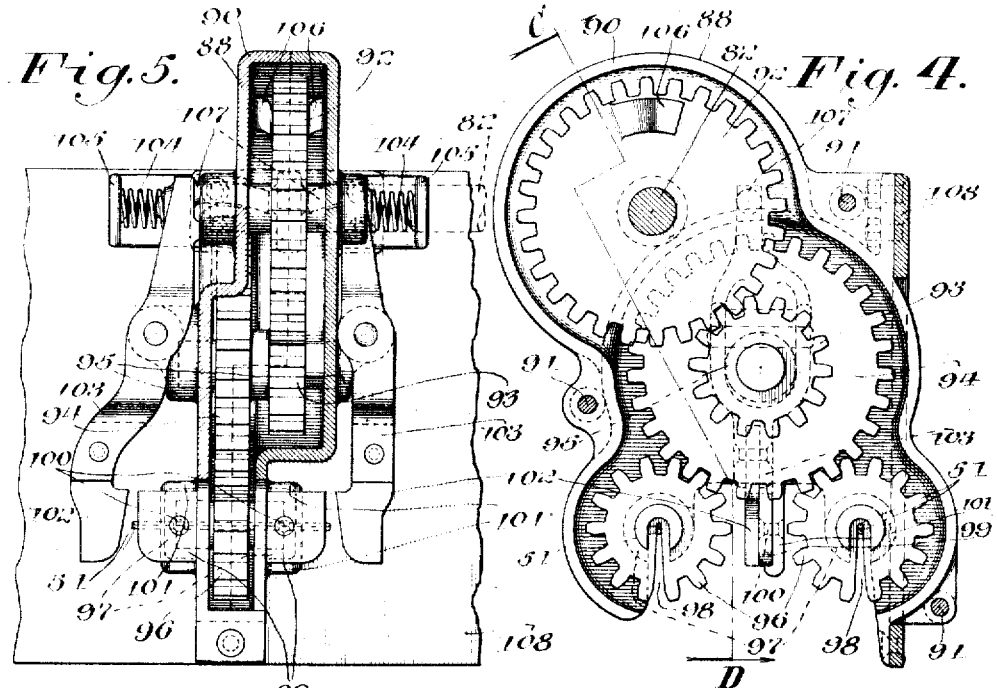
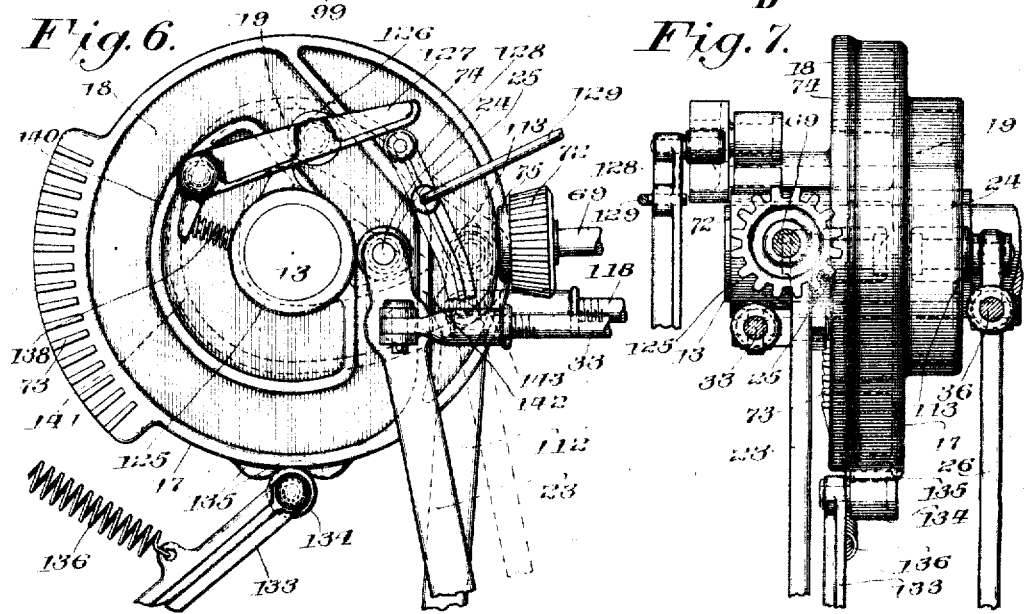
Witnesses:
C. C. Palmer
F. W. Hoffmeister
Inventor
Edward W. Burgess,
By Chas. E. Lord
Atty.

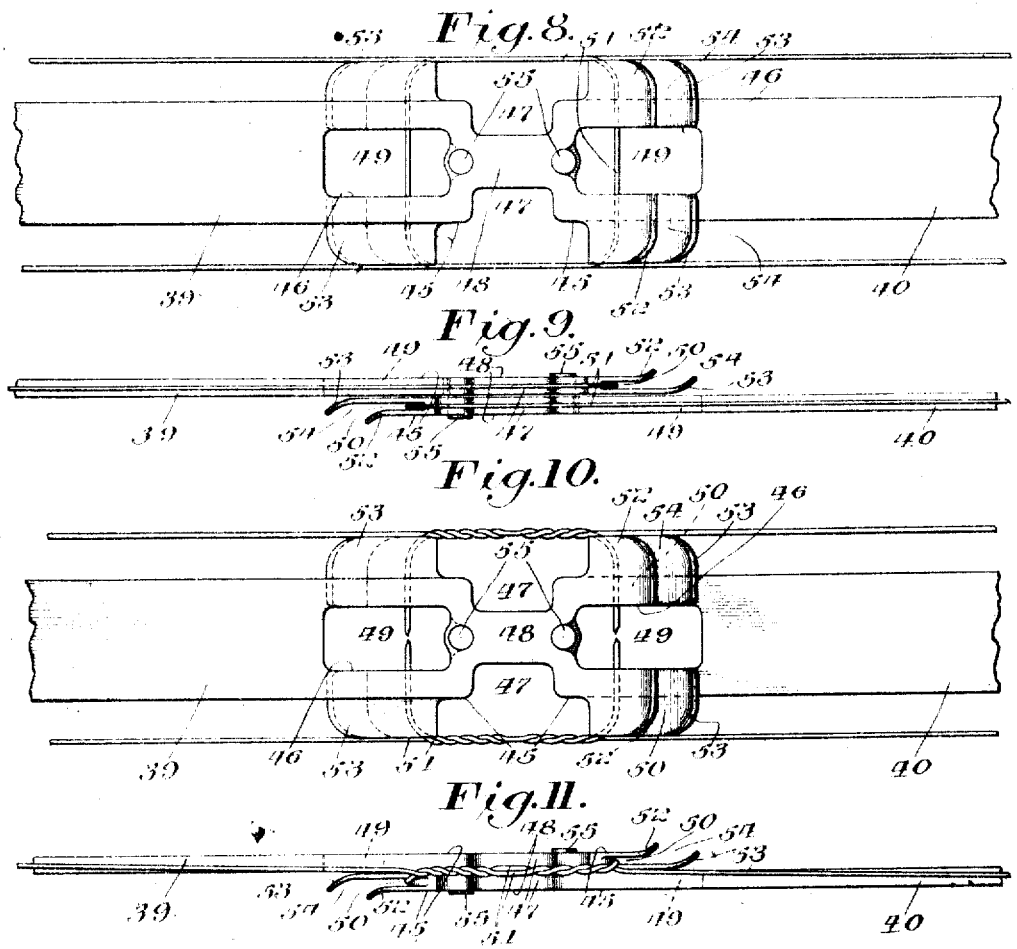

UNITED STATES PATENT OFFICE.

EDWARD W. BURGESS, OF CHICAGO, ILLINOIS, ASSIGNOR TO INTERNATIONAL HARVESTER COMPANY OF NEW JERSEY, A CORPORATION OF NEW JERSEY.

BALING-PRESS.

1,237,608. Specification of Letters Patent. Patented Aug. 21, 1917.

Application filed August 8, 1914. Serial No. 855,736.

*To all whom it may concern:*

Be it known that I, EDWARD W. BURGESS, a citizen of the United States, residing at Chicago, in the county of Cook and State of Illinois, have invented certain new and useful Improvements in Baling-Presses, of which the following is a full, clear, and exact specification.

My invention relates to baling presses, and in particular to automatic means for placing the binding wires around a bale and securing them in a binding position. It consists in wire carrying arms, wire connecting mechanism actuated by the presser head operating means, when tripped into action therewith, that will place the binding wires across the end of a bale in overlapping positions and automatically twist the wires one upon another to connect them and then sever the wires encircling the bale from those leading from the source of wire supply.

The object of my invention is to provide an improved mechanism simple in its parts and positive and efficient in operation. I attain these results by means of mechanism, one embodiment of which is illustrated in the accompanying drawings, in which—

Figure 1 is a side elevation of part of a baling press having my invention embodied in its construction;

Fig. 2 is a top plan view of part of Fig. 1;

Fig. 3 is a vertical section of Fig. 2 along line A—B and on an enlarged scale;

Fig. 4 is a vertical section on an enlarged scale of one of the wire twisting heads;

Fig. 5 is a sectional view taken on line C—D of Fig. 4;

Fig. 6 is a side elevation of a cam wheel forming part of the bale binding mechanism and which is journaled upon the power shaft of the press;

Fig. 7 is a side elevation of the mechanism shown in Fig. 6;

Fig. 8 is a top plan view on an enlarged scale of the free ends of a pair of wire carrying arms illustrating the manner of placing the wires in overlapping loops within the bale chamber;

Fig. 9 is a side view of the parts shown in Fig. 8;

Fig. 10 is a view similar to Fig. 8 and showing the side members of the overlapping loops as twisted one upon another and the end members as severed at their middle; and Fig. 11 is a side view of the parts shown in Fig. 10.

Referring to the drawings, wherein the same reference numerals designate like parts throughout the several views, 1 represents the feed hopper of a common form of hay press, 2 the self-feeding mechanism operative to deliver the material from the feed hopper to a compression chamber 3, 4 the bale chamber having upper and lower longitudinally disposed side frame members 5 and 6, respectively, upon opposite sides of the machine, and intermediate frame members 7. The compression chamber includes longitudinally disposed upper and lower members 8 and 9, respectively, upon opposite sides of the machine and extending in rear of the chamber. 10 represents plates forming the side walls of the chamber. 11 represents the presser head having a reciprocating movement within the compression chamber, and actuated by means including a rack bar 12 driven from a power shaft 13, that is journaled in bearings carried by the frame of the machine, and given continuous rotative movement by means including a gear wheel 14 secured to the shaft and a driving pinion 15 engaging therewith and secured to a transverse shaft 16 journaled upon the frame of the machine and connected with a source of power. Journaled upon the power shaft 13 is a cam wheel 17, having cam channels 18 and 19 upon its outside and inside faces, respectively. 20 and 21 represent transversely disposed rock shafts journaled in bearings 22 secured to the frame members 9 upon opposite sides of the machine. 23 represents a vertically disposed arm having its lower end secured to the rock shaft 20 and its upper end provided with a laterally disposed stud 24, upon which is journaled a roller 25, that is received by the cam channel 18, and 26 represents a vertically disposed arm secured to the rock shaft 20 upon the opposite side of the machine. 27 represents a vertically disposed rock shaft journaled in bearings 28 and 29 secured to the frame members 8 and 9 of the press frame, respectively, and secured thereto intermediate its ends is an arm 30, having the free end thereof provided with a radially slotted opening 31 that adjustably receives a stud 32, and 33 represents a link adjustable in length and connecting the stud 32 with the vertically disposed arm 23. 34 represents a vertically disposed rock shaft journaled upon the opposite side of the press frame and having an arm 35 like in form with the arm 30 secured thereto and connected with the arm 26 by means of a longitudinally adjustable link 36. Integral with the arms 30 and 35 are arms 37 and 38, respectively, to which are secured the rear ends of lower wire carrying arms 39 and 40, respectively. 41 and 42 represent arms secured to the shafts 27 and 34, respectively, near the upper side of the compression chamber and having the rear ends of wire carrying arms 43 and 44 secured thereto, respectively. The two pairs of wire carrying arms extend along the compression chamber parallel with each other and toward the bale chamber, and have their free ends curved inward concentric with the axes of the rock shafts to which their rear ends are secured. The arms are preferably formed from flat bars of steel disposed with their wide surfaces in horizontal planes and having widened head portions 45 provided with centrally and longitudinally disposed open ended slots 46 for a purpose to be described later. Oppositely disposed gaps 47, upon opposite sides of the head members, lead to central narrow neck portions 48 connecting the heads with the bodies of the arms, and 49 represents longitudinally disposed slots in the bodies of the bars with one end adjacent the neck portions. The ends of the heads are curved laterally toward the bodies and have transverse channels 50 therein for the reception of the wires 51 that are looped across the ends of the heads, as shown in Figs. 8 and 9. The walls of the channels are of different lengths, the shorter wall 52 being turned away from the channel, and the longer wall 53 across it, forming a gap 54 between the ends of the walls to readily receive the wire. 55 represents stop lugs carried by the head and operative to limit the extent of their overlap as they move to coacting position, as shown in Fig. 8. The wire engaging heads 45 with the arms 43 pass through longitudinally disposed openings in the side walls of the compression chamber, and 56 represents guides spaced apart and secured to the wall upon opposite sides of the openings and adapted to receive the wire carrying heads between them, one of each pair of guides being slotted longitudinally to receive the stop lugs 55 carried by the heads and limit an outward swing of the wire carrying arms, as shown in Fig. 3.

A supply of wire is carried upon spools 57 that are rotatably mounted upon opposite sides of the press frame in rear of the compression chamber, one spool for each wire carrying arm, and the wires are led from the spools along the outside of the compression chamber to wire guiding eyes 58, located adjacent the openings in the walls of the chamber, that receive the wire carrying arms. The wires are then drawn through the eyes to an overlapping position within the compression chamber, and each pair, upper and lower, is connected together by looping or twisting the overlapping ends together.

When material is fed to the compression chamber by the feeding mechanism the presser head carries a charge against the baling wires and into the bale chamber, and successive charges carry the wires along the walls of the bale chamber across the wire carrying heads 45 and into the gaps 54 in position to be carried into the chamber in looped form when the wire carrying arms are actuated, the loops overlapping in rear of the bale, as shown in Fig. 8, in position to be engaged by the wire connecting and severing mechanism including a vertically disposed guide bar 59 spaced apart from the side wall of the compression chamber by means of spacing blocks 60 and secured thereto by means of bolts 61. The guide bar is extended above and below the upper and lower walls of the compression chamber, and 62 represents brace members connecting the opposite ends of the bar with the walls of the chamber. Secured to the middle of the guide bar, by the bolts 61, is a bracket member 63, having at its opposite ends vertically disposed upper and lower sleeve members 64, spaced apart and in which is journaled a vertical shaft 65, having a pinion 66 secured thereto below the upper sleeve, and a collar 67 above the lower sleeve. The bracket member 63 is also provided with a horizontally disposed bearing sleeve 68, in which is journaled the front end of a longitudinally disposed shaft 69, having secured thereto a pinion 70 meshing with the pinion 66. The rear end of the shaft 69 is journaled in a bearing 71 carried by the frame of the machine, and secured to the shaft is a pinion 72 adapted to engage with a gear segment 73 upon the cam wheel 17, 74 being a delay rim carried by the wheel and adapted to engage with a tangentially disposed flattened portion upon the hub 75 of the pinion 72 when the pinion is disengaged from the gear segment in a manner to insure a proper engagement of the two gears when the cam wheel 17 is given a rotatable movement, the gears being so proportioned as to cause one revolution of the pinion at each revolution of the wheel. 76 represents gear carrying heads slidably mounted upon opposite ends of the guide bar 59 by means of sleeve members 77 that are provided with laterally extending studs 78 whereby the heads are pivotally connected with the front ends of longitudinally disposed bars 79 and 80, having their rear ends pivotally connected with the upper and lower frame members 8 and 9, respectively.

The gear carrying heads 76 include tubular members 81 disposed transversely of the compression chamber and in which are journaled shafts 82, having bevel pinions 83 secured to the outside ends thereof and meshing with corresponding pinions 84, the hubs of which carry keys that are received by key-ways 85 formed in opposite ends of the vertical shaft 65 in a manner permitting the pinions to slide upon the shaft in an operative manner in a well-known way. The shaft 65 is journaled in bearings 86 integral with the heads, and 87 represents hoods forming part of the head and protecting the pinions 83 and 84. The opposite ends of the tubular members 81 carry a gear casing 88, that is preferably made in two parts, one of the parts 89 being integral with the tubular members and the remaining complemental part 90 secured thereto as by means of rivets 91. Secured to the opposite ends of the shafts 82 are spur gear members 92, that mesh with pinions 93 that are as one piece with spur gears 94 journaled in bearings 95 that are integral with the oppositely disposed side walls of the gear casing. The gears 94 mesh with the wire twisting pinions 96, spaced apart upon opposite sides of the gears 94, and journaled in bearings 97 carried upon opposite sides of the gear casing. The pinions 96 and their journals are provided with radially disposed open ended slots 98 that extend from their peripheries to a point beyond their axes, that normally register with corresponding slots in the bearing members 97 in position to receive the baling wires when the heads are moved to a coacting position with the wire carrying arms. 99 represents fixed wire severing members intermediate the wire twisting pinions 96 and secured by means of rivets 100 to laterally extending ear members 101 integral with the side walls of the gear casing 88, and 102 represents movable wire severing blades secured to the lower ends of vertically disposed rocking levers 103 pivotally mounted upon opposite sides of the gear casing and normally held away from the fixed members 99 by means of compression springs 104 operative between the opposite ends of the levers and laterally extending ear members 105 integral with the gear casing. To rock the levers in a wire severing direction the gear members 92 are provided near their peripheries with concentric laterally disposed rib members 106 that intermittently engage with inwardly extending block members 107 integral with the upper ends of the rocking levers 103.

The coacting gears have preferably a two to one ratio, and when the gear members 92 are given one complete revolution the wire twisting pinions 96 are given four revolutions; but it is apparent that such proportions may be varied in a manner to actuate the pinions 96 a more or less number of revolutions as desired, and the wire severing mechanism may be actuated at any degree of the angular movement of the gear members 92, preferably just before they have been given a complete revolution and as the wire twisting pinions are approaching their initial position.

Carried with the gear carrying head 76 are tucker plates 108, secured at their middle to the gear casing 88 and at one end to an ear 109 extending forward from the gear hoods 87. 110 represents U-shaped members, having one leg 111 secured to the opposite end of a tucker plate and the remaining legs pivotally connected with the front ends of the bars 111¹, having their rear ends pivotally connected with the frame members of the press in the same manner as the head controlling bars 79 and 80 upon opposite sides of the machine. 112 represents a vertically disposed arm having its lower end secured to the rock shaft 21, its upper end provided with a laterally extending stud having a roller 113 journaled thereon and received by the cam channel 19. 114 represents a rocking sleeve journaled upon a stud 115 secured to the side wall of the compression chamber intermediate the head controlling bars 79 and 80, and integral with the opposite end of the sleeve is a depending arm 116 provided with a radial elongated opening that receives a stud 117 whereby the arm is connected with the front end of a link 118, having its opposite end connected with the arm 112, and 119 represents oppositely disposed arms integral with the opposite end of the sleeve and disposed longitudinally relative to the compression chamber and connected with the middle portions of the head controlling bars 79 and 80 by means of links 120. 121 represents a vertically disposed arm having its lower end secured to the opposite end of the rock shaft 21, and upon the opposite side of the machine, and having its upper end connected, by means of a link 122, with a three-armed rocking member 123 like in form and pivoted upon the opposite side of the compression chamber and connected with the head controlling bars 111¹ by means of links 124, as shown by dotted lines in Fig. 2.

The cam wheel 17 is operatively connected with the power shaft 13 by means of a common form of clutch mechanism including a driver 125 secured to the shaft and adapted to intermittently engage with a roller 126 carried by a pawl arm 127 pivotally mounted upon the cam wheel 17 and normally held in a position with the roller disengaged from the driver by means of a swinging clutch tripping arm 128 engaging with its free end, and when the arm is released a spring 138 will swing the pawl in a direction to cause the roller to engage with the driver. The arm 128 is connected, by means of a rod 129, with a hand lever 130 pivotally mounted upon the side of the feed hopper within convenient reach of an operator and yieldably held in a direction to cause the arm 128 to trip the clutch mechanism out of action by means of a tension spring 131, having one end secured to the side of the feed hopper and its opposite end adjustably connected with the rod 129 by means of a clip member 132. 133 is an arm pivoted upon a fixed part of the machine and carrying a roller 134 at its free end that engages with a peripheral cam 135 upon the cam wheel 17 in a manner to bring the wheel to a "home" position as is common in this class of clutch mechanism, the arms being yieldably held toward the axis of the wheel by means of a tension spring 136 connecting it with a fixed part 137 of the machine.

In operation material may be continuously fed from the feed hopper to the compression chamber and the reciprocating presser head carries successive charges into the bale chamber, carrying the baling wires along with the bale as it is being formed, the wires leading along the sides of the bale chamber across the head portions 45 of the wire carrying arms and in proper relation thereto to be engaged by the heads when they are caused to move inward within the walls of the compression chamber, the wires leading through the guiding eyes 58 to the spools 57. When sufficient material has been pressed into the baling chamber to form a bale having the desired length the operator will move the hand lever 130 in a direction to disengage the clutch tripping arm 128 from the pawl member 127 and permit it to carry the roller 126 within the path of the driver 125 secured to the power shaft 13. The power shaft rotates through one revolution and the presser head is moved thereby and caused to traverse the compression chamber in its forward and backward stroke. The driver 125 is secured to the power shaft 13 in such relation that the presser head actuating mechanism permits it to engage the roller when the presser head has started upon its backward stroke. The cam wheel 17 then rotates with the shaft 13. The initial positions of the arms 23 and 112 are as shown in Fig. 6, with the roller 113, shown in dotted lines, on the arm 112, at its greatest distance radially from the axis of the cam wheel, and when the cam wheel 17 begins its rotative movement the cam on the wheel causes the arm 112 to swing toward the axis of the cam wheel and rock the shaft 21 in a direction to cause its associated mechanism to move the heads 76 toward each other and the twisting and cutting heads toward each other within the walls of the compression chamber. The tucker plates 108 move across the end of the bale in a manner to clear the space for the entrance of the wire carrying arms, that are then actuated by the roller 25 engaging with the part 140 of the inner wall of the cam channel 18, thereby swinging the arms 23 and 26 away from the axis of the cam wheel 17 and rocking the shaft 20 and the vertical shafts 27 and 34 through their associated mechanism, and thereby swinging the two pairs of wire carrying arms to overlapping position within the compression chamber with the loops in the wires overlapping each other in rear of a bale. The part 141 on the cam 19 then engages the roller 113 and the arms 112 and 121 are given a further movement toward the axis of the cam wheel 17 through their connecting mechanism, moving the gear carrying heads 76 and the wire twisting pinions 96 in position to cause the side members of the loops of wire to enter the slots 98 in the wire twisting pinions 96, the gaps 46 receiving the ends of the gear casing 88 and the end members of the loops are received between the wire severing blades 99 and 102, that are received by the slots 46 and 49 in the wire carrying heads. The gear segment 73 then engages with the pinion 72 and rotates the shaft 69 through one revolution, and thereby, through the associated gear mechanism, rotating the wire twisting pinions through four revolutions to twist the wires together, and the gear member 92 one revolution, its rotative movement actuating the movable blades 102 of the wire severing mechanism. The part 142 of the outside wall of the cam channel 18 then engages with the roller 25 upon the arm 23 and the part 143 of the outside wall of the cam channel 19 with the roller 113 upon the arm 112, and the arms 23 and 112 are thereby moved to their initial positions, carrying with them the wire carrying arms and twister heads to their former positions without the compression chamber. The clutch mechanism is then tripped out of action by the pawl arm 127 engaging with the clutch tripping arm 128, the roller 134 engaging with the cam 135 as the cam wheel reaches its position of rest. The operation of the bale binding mechanism is so timed that the wire carrying heads and wire twisting mechanism enter the compression chamber as soon as the presser head has moved away from the end of the bale to permit their free entrance, and as the tucker plates move in advance of the wire carrying arms any loose material is carried out of their path and the arms and heads, after completing the binding operation, are moved without the compression chamber before the presser head has advanced the charge for a new bale, thus providing for a continuous operation of the feeding mechanism without any interruption as when division blocks are used. Furthermore, as nearly a complete revolution of the power shaft is utilized to actuate the bale binding mechanism moving in unison with the presser head and its operative parts, they are given a comparatively slow movement, thereby insuring both durability and efficiency.

Having shown and described a preferred form of my invention, I do not wish that it be confined to the specific details of construction, as it is understood that many changes may be made in form and mode of operation of the various parts of the mechanism without departing from the spirit of my invention.

What I claim as my invention, and desire to secure by Letters Patent, is:

1. A baling press including a bale casing forming a chamber, a plurality of series of wire carriers normally located exterior to said casing movable across said chamber, and means for actuating said carriers including a single power actuated controlling cam member.

2. A baling press including a bale chamber, a power shaft, a plurality of series of wire carriers movable across said chamber, and means for actuating said carriers including a single controlling cam member journaled upon said power shaft.

3. A baling press including a bale chamber, a plurality of wire carriers movable across said chamber in different planes, and means for actuating said carriers including a single intermittently rotatable controlling cam member.

4. A baling press including a bale chamber, a power shaft, a plurality of wire carriers movable across said chamber in different planes, and means for actuating said carriers including a single intermittently rotatable controlling cam member journaled upon said power shaft.

5. A baling press including a bale chamber, a power shaft, a presser head operatively connected with said shaft, wire carriers movable across the end of said chamber, and means for actuating said carriers, said means including an intermittently rotatable cam member journaled upon said power shaft.

6. A baling press including a bale chamber, a power shaft, a presser head operatively connected with said shaft, wire carriers movable across said chamber, means for actuating said carriers, said means including an intermittently rotatable cam member journaled upon said shaft, and a clutch mechanism operative between said shaft and said cam.

7. A baling press including a compression chamber, wire carrying arms pivotally mounted upon opposite sides of said chamber, a wire supply for each of said arms, means for moving said arms and wire to an overlapping position within said chamber, and tucking means movable into said chamber in advance of said arms.

8. A baling press including a compression chamber, means including wire carrying arms pivotally mounted upon opposite sides of said chamber for carrying wire into said chamber in the form of overlapping loops, and tucking means movable into said chamber in advance of said arms.

9. A baling press including a compression chamber, means including wire carrying arms pivotally mounted upon opposite sides of said chamber for carrying wire into said chamber in the form of overlapping loops, tucking means movable into said chamber in advance of said arms, and means for twisting the side members of said loops.

10. A baling press including a compression chamber, means including wire carrying arms pivotally mounted upon opposite sides of said chamber for carrying wire into said chamber in the form of overlapping loops, tucking means movable into said chamber in advance of said arms, means for twisting the side members of said loops, and means for cutting the end members of said loops.

11. A baling press including a compression chamber, wire carrying arms pivotally mounted upon opposite sides of said chamber having knife receiving heads, a source of wire supply for each of said arms, means for moving said arms to an overlapping position within said chamber and thereby doubling the wire in two loops in parallel relation at one end of a bale and between the sides thereof, and a knife for passing into said heads to cut the wire.

12. A baling press including a compression chamber, wire carrying arms pivotally mounted upon opposite sides of said chamber having knife receiving heads, a source of wire supply for each of said arms, means for moving said arms to an overlapping position within said chamber, said arms doubling the wire into two overlapping loops with the sides thereof disposed transversely relative to said chamber, means for automatically twisting together the side members of the overlapping loops, and a knife for passing into said heads for cutting the wire.

13. A baling press including a compression chamber, means including wire carrying arms pivotally mounted at the sides of said chamber for carrying wire into said chamber in the form of overlapping loops, and means including wire twisting and cutting means operable upon said loops and movable vertically into said chamber.

14. A baling press including a compression chamber, means including wire carrying arms pivotally mounted at the sides of said chamber for carrying wire into said chamber in the form of overlapping loops, means including wire twisting and cutting means operable upon said loops and movable in a plane at right angles to the plane of movement of said arms, and means including a single cam member for controlling the movement of said last two elements.

15. A baling press including a compression chamber, wire carrying arms pivotally mounted upon opposite sides of said chamber, a source of wire supply connected with each arm, means for moving said arms and wire to an overlapping position within said chamber, and means carried by the ends of said arms and operative to limit the extent of their overlap.

16. A baling press including a compression chamber, wire carrying arms having one end of each pivotally connected with a fixed part of the press frame and their opposite ends movable through openings in the side walls of said chamber, means for swinging the free ends of said arms to an overlapping position within said chamber, means carried by the ends of said arms operative to limit the extent of their overlap, and means carried by the side walls of said chamber and engaging with said means in a manner to limit the extent of a swinging movement of said arms in an opposite direction.

17. A baling press including a compression chamber, wire carrying arms having one end of each pivotally connected with a fixed part of the press frame, a source of wire supply for each of said arms, means for moving the opposite ends of said arms to an overlapping position within said chamber, said arms doubling the wire into overlapping loops with the sides thereof disposed transversely of said chamber, and means for automatically connecting the side members of said overlapping loops and severing the longitudinal end members thereof near their middle.

18. A baling press including a compression chamber, wire carrying arms pivotally mounted upon opposite sides of said chamber, a source of wire supply for each of said arms, means for moving said arms to an overlapping position within said chamber and thereby doubling the wire into overlapping loops, and wire twisting mechanism movable at right angles to the path of movement of said arms and adapted to engage with the side members of the overlapping loops.

19. A baling press including a compression chamber, wire carrying arms pivotally mounted upon opposite sides of said chamber and adapted to swing in horizontal planes, a source of wire supply for each arm, means for swinging said arms to an overlapping position within said chamber and thereby doubling the wire into overlapping loops, and wire twisting and cutting mechanism moving in a vertical plane from positions without the walls of said chamber to one in engagement with the members of the overlapping loops.

20. A baling press including a compression chamber, wire carrying arms pivotally mounted upon opposite sides of said chamber spaced apart vertically and adapted to swing in horizontal planes, a source of wire supply for each arm, means for swinging said arms to an overlapping position within said chamber and thereby doubling the wires into overlapping loops, and wire twisting and cutting heads movable in opposite directions and in a vertical plane from without the opposite walls of said chamber to a position within it and in engagement with the side and end members of the overlapping loops.

21. A baling press including a compression chamber, a power shaft, a plunger operatively connected thereto, vertically disposed rock shafts journaled upon opposite sides of the press frame, wire carrying arms, each having one end secured to one of said rock shafts, the opposite ends of said arms swinging to an overlapping position within said chamber when said rock shafts are rotated in one direction, and means for actuating said rock shafts during the return stroke of said plunger including a cam wheel journaled upon said power shaft.

22. A baling press including a compression chamber, a power shaft, and automatically operative bale binding mechanism, said mechanism including wire cutting elements movable bodily and intermittently in opposite directions from positions without said chamber to positions between the walls thereof.

23. A baling press including a compression chamber, a power shaft, and automatically operative bale binding mechanism, said mechanism including wire cutting elements movable bodily in a vertical plane and in opposite directions from positions without said chamber to positions within the walls thereof.

24. A baling press including a compression chamber, a power shaft, automatically operative bale binding mechanism, said mechanism including wire cutting elements movable bodily and intermittently in opposite directions from positions without said chamber to positions within the walls thereof, and actuating means therefor including clutch mechanism carried by said power shaft.

25. A baling press including a compression chamber, a power shaft, automatically operative bale binding mechanism, said mechanism including wire cutting elements movable bodily and intermittently in opposite directions from positions without said chamber to positions within the walls thereof, actuating mechanism therefor including a vertically disposed shaft journaled in bearings carried by the frame of the press and operatively connected with said wire cutting elements, a cam wheel journaled upon said power shaft, and gear connections between said cam wheel and said vertically disposed shaft.

26. A baling press including a compression chamber, a power shaft, automatically operative bale binding mechanism, said mechanism including vibratable bars having one end thereof pivotally connected with the press frame, wire cutting elements carried by the free ends of said bars and movable into and out from said chamber, a cam wheel journaled upon said power shaft, a clutch mechanism connecting said wheel with said shaft, a bell crank lever pivotally mounted upon the press frame, and a link connection between said lever and said bars and between said lever and said cam wheel.

27. A baling press including a compression chamber, a power shaft, automatically operative bale binding mechanism, said mechanism including wire cutting elements movable bodily and intermittently in opposite directions from positions without said chamber to positions within the walls thereof, and actuating mechanism therefor including a vertically disposed shaft journaled in bearings carried by the frame of the press, having said wire cutting elements slidably mounted upon its opposite ends and actuated thereby, a cam wheel journaled upon said power shaft, clutch mechanism connecting said cam wheel with said power shaft, and gear connections between said cam wheel and said vertically disposed shaft.

28. A baling press including a compression chamber, a power shaft, automatically operative bale binding mechanism including wire carrying arms movable through the side walls of said chamber in opposite directions to an overlapping position within said chamber in a manner forming two overlapping loops in the wire, wire twisting elements movable toward and from said loops and having slotted pinions adapted to engage with the side members thereof, a driving gear operatively connected with said pinions, and wire severing means actuated by said driving gear.

29. A baling press including a compression chamber, a power shaft, automatically operative bale binding mechanism, said mechanism including wire carrying arms movable through the side walls of said chamber in opposite directions and to overlapping position within said chamber in a manner forming two overlapping loops in the wire, a gear casing movable toward and from said overlapping arms, wire twisting pinions spaced apart and journaled in said casing, said pinions having radially disposed slots adapted to receive the side members of the overlapping loops of wire, a driving gear journaled in said casing and operatively connected with said pinions, and wire severing elements pivotally mounted upon said casing and actuated by said driving gear.

30. A baling press including a compression chamber, a power shaft, a plunger operatively connected to said power shaft, mechanism for binding a bale in said chamber, and controlling mechanism therefor operable at any desired time for throwing said binding mechanism into operation as said plunger is making its return stroke.

31. A baling press including a compression chamber, a power shaft, a single cam member journaled on said power shaft, automatic mechanism for binding a bale in said chamber operatively connected to said cam member and controlled thereby, and clutch mechanism controlling the connections of said cam to said shaft.

32. A baling press including a compression chamber, mechanism movable into said chamber for binding a bale therein, and tucking means movable into said chamber in advance of said binding mechanism.

33. A baling press including a compression chamber, mechanism movable into said chamber for binding a bale therein and cutting the wire, and tucking means movable into said chamber in advance of said binding and cutting mechanism.

34. A baling press including a compression chamber, a power shaft, automatically operative bale binding mechanism, said mechanism including wire carrying arms movable through the side walls of said chamber adjacent the end of a bale, and wire cutting means movable through the walls of said chamber coacting with said arms and carrying a tucker element.

35. A baling press including a compression chamber, a power shaft, automatically operative bale binding mechanism, said mechanism including wire carrying arms movable through opposite side walls of said chamber adjacent the end of a bale, wire cutting means movable at right angles to the plane of said arms coacting therewith and carrying a tucker element.

36. A baling press including a compression chamber, a power shaft, automatically operative bale binding mechanism, said mechanism including wire carrying arms movable through opposite side walls of said chamber adjacent the end of a bale, wire cutting means movable at right angles to the plane of movement of said arms and carrying a tucker plate, and means for moving said wire cutting means in a step by step manner toward said arms.

37. A baling press including a compression chamber, a power shaft, automatically operative bale binding mechanism, said mechanism including wire carrying arms having one end of each pivotally connected with the press frame upon opposite sides of said chamber, the free ends of said arms being movable through the side walls of said chamber to an overlapping position in a manner to form the wire into overlapped loops, and means for twisting the side members of said loops together and severing the end members thereof.

38. A baling press including a compression chamber, a power shaft, automatically operative bale binding mechanism, said mechanism including wire carrying arms pivotally mounted upon opposite sides of said chamber and movable to an overlapping position within said chamber, tucker and wire cutting means movable in a plane at right angles to the plane of movement of said arms and in opposite directions, and means for moving said tucker and wire cutting mechanism in advance of the movement of said arms to an overlapping position and then to a wire twisting and severing position.

39. A baling press including a compression chamber, a power shaft, automatically operative bale binding mechanism, said mechanism including wire carrying arms movable across said chamber, wire cutting mechanism coacting with said arms, a cam wheel journaled upon said power shaft, and clutch mechanism operative to intermittently connect said wheel with said shaft, said wheel being operatively connected with said wire carrying arms and said wire cutting means.

40. A baling press including a compression chamber, a power shaft, automatically operative bale binding mechanism, said mechanism including wire carrying arms, wire cutting movable in said chamber, wire cutting mechanism coacting with said arms and bodily movable into and from said chamber, a wheel journaled upon said power shaft, cam tracks upon opposite sides of said wheel, one of said cam tracks controlling the movement of said arms and the remaining cam track a bodily movement of said wire cutting mechanism, and a mutilated gear carried by said wheel and controlling the rotatable movement of said wire cutting elements.

41. A baling press including a compression chamber, a power shaft, automatically operative bale binding mechanism, said mechanism including wire carrying arms movable in horizontal planes from positions without the opposite walls of said chamber to positions within said chamber, and wire cutting means movable in a vertical plane from positions without the walls of said chamber to a coacting position with said wire carrying arms.

42. A baling press including a compression chamber, a power shaft, automatically operative bale binding mechanism, said mechanism including wire carrying arms movable in horizontal planes from positions without the opposite walls of said chamber to positions within the same, wire twisting heads movable in a vertical plane from without the upper and lower walls of said chamber to coacting positions with said wire carrying arms, and vertically swinging arms carrying said heads.

43. A baling press including a compression chamber, a power shaft, automatically operative bale binding mechanism, said mechanism including wire carrying arms movable in horizontal planes in opposite directions in a manner to carry the wires into crossed relation in said chamber, wire twisting heads movable in a vertical plane through the upper and lower walls of said chamber in position to engage with the wires carried by said arms, and a vertically arranged guide bar secured to one side of said chamber and having said wire twisting heads slidably mounted thereon.

44. A baling press including a compression chamber, a power shaft, automatically operative bale binding mechanism, said mechanism including wire carrying arms movable in horizontal planes in opposite directions in a manner to carry the wires into crossed relation within said chamber, wire twisting heads movable in a vertical plane through the upper and lower walls of said chamber in position to engage with the crossed wires carried by said arms, a vertically arranged power shaft journaled upon the side of said chamber and having said heads slidably connected therewith, and a vertically arranged guide member adjacent said shaft and having said heads slidably mounted thereon.

45. A baling press including a compression chamber, a power shaft, automatically operative bale binding mechanism including a cam wheel journaled upon said power shaft, clutch mechanism connecting said wheel with said shaft, a transversely disposed rock shaft journaled upon the frame of the press parallel with said power shaft, levers secured to one end of said rock shaft and engaging with said cam wheel, lever arms secured to the opposite ends of said rock shaft, vertically arranged rock shafts journaled upon opposite sides of said press frame and operatively connected with the free ends of one pair of said lever arms, wire carrying arms secured to said vertically disposed rock shafts, vertically swinging arms pivotally mounted upon opposite sides of said press frame and carrying at their free ends wire twisting heads, rocking bell crank levers journaled upon opposite sides of said press frame, and link connections between said vertically swinging arms and said bell crank levers and between the remaining pair of said lever arms and said bell crank levers.

In testimony whereof I affix my signature, in the presence of two witnesses.

EDWARD W. BURGESS.

Witnesses:
CLYDE C. PALMER,
T. N. DAGGETT.